United States Patent [19]

Serrano

[11] Patent Number: 4,599,491
[45] Date of Patent: Jul. 8, 1986

[54] APPARATUS FOR CONVERTING DIRECT COUPLED DATA DEVICES TO ACOUSTIC COUPLED DATA DEVICES

[75] Inventor: Arthur L. Serrano, Canoga Park, Calif.

[73] Assignee: Novation, Inc., Chatsworth, Calif.

[21] Appl. No.: 629,096

[22] Filed: Jul. 9, 1984

[51] Int. Cl.$^4$ ............................................. H04M 11/00
[52] U.S. Cl. ..................................................... 179/2 C
[58] Field of Search ............................ 179/2 C, 2 DP

[56] References Cited

U.S. PATENT DOCUMENTS 4,409,437  10/1983  Horyu ............................. 179/2 DP
4,415,769  11/1983  Gray .................................. 179/2 C Primary Examiner—Keith E. George
Attorney, Agent, or Firm—Blakely, Sokoloff, Taylor & Zafman

[57] ABSTRACT

A method and apparatus for converting direct coupled data devices to acoustic coupled devices is disclosed. The apparatus consists of an acoustic coupler and associated electronics to provide acoustic coupling to a telephone handset and to connect to a direct connect modem or other data device to allow operation of the direct connect modem in most modes as if directly connected to a telephone line. The device disclosed includes circuitry for off-hook detection for automatically turning on the electronics, so that battery power is only active when required. Other features and characteristics of the device are disclosed.

7 Claims, 2 Drawing Figures

APPARATUS FOR CONVERTING DIRECT COUPLED DATA DEVICES TO ACOUSTIC COUPLED DATA DEVICES

BACKGROUND OF THE INVENTION

1. Field of the Invention.

The present invention relates to the field of modulator demodulator sets and other data devices for digital communication over conventional telephone lines.

2. Prior Art.

Various types of modems, that is modulator/demodulator sets for digital communication over conventional telephone lines are well-known in the prior art. Such devices generally fall into one of two categories, specifically acoustic coupled devices and direct connect devices. Acoustic coupled devices may be characterized as having a speaker and microphone for disposition adjacent the microphone and speaker, respectively, on a conventional telephone handset, so that the digital signals being transmitted and received to and from the telephone system are coupled as audible signals. This of course works reasonably well, as a conventional telephone lines have a relatively narrow band pass which is not suitable for transmission of base band signals anyway. Acoustic coupling has the specific advantage of not requiring a direct line connection to the telephone line so as to be highly versatile, provided the coupler itself is suitable for mating with the desired range of telephone handsets. It does have the disadvantages, however, of sometimes being larger than a direct connect modem because of the requirement of the couplers and coupler spacing, of perhaps being more expensive for the same reason, and of suffering somewhat in signal-to-noise ratio because of the conversion of electronic signals to acoustic signals and back again, particularly in light of the poor frequency response of speakers and microphones in conventional handsets.

In recent years modular telephone connectors for connecting telephone lines to receivers and for connecting handsets to receivers have been mandated. These modular connectors allow the direct connection of a modem to a telephone line with the attendant reduction in cost and size of direct connect modems and improved performance over acoustic coupled modems. At the present time, a substantial percentage of telephones use the modular connectors, which percentage is steadily increasing. Accordingly, the ratio of direct connect modems to acoustic modems being sold is undoubtedly also steadily increasing because of the advantages of direct connects. However, there are many instances where direct connect modems cannot be used, such as in phone equipment already installed before the advent of the modular connection, multiline telephones, phones in phone booths, motels, etc. Thus, there will be instances encountered by traveling persons and others using portable terminals and other digital equipment where the direct connect modem commonly used therewith cannot be used with available phones. Heretofore there has been no known adapter or converter such as the present invention for providing an acoustic interface between a direct connect modem and a telephone to allow the use of a direct connect modem system on a phone system to which a direct connection cannot be made, whether that direct connect modem be a stand-alone device or integrated into some larger piece of digital equipment.

BRIEF SUMMARY OF THE INVENTION

A method and apparatus for converting direct coupled data devices to acoustic coupled devices is disclosed. The apparatus consists of an acoustic coupler and associated electronics to provide acoustic coupling to a telephone handset and to connect to a direct connect modem or other data device to allow operation of the direct connect modem in most modes as if directly connected to a telephone line. The device disclosed includes circuitry for off-hook detection for automatically turning on the electronics, so that battery power is only active when required. Other features and characteristics of the device are disclosed.

DETAILED DESCRIPTION OF THE INVENTION

Figure 1:
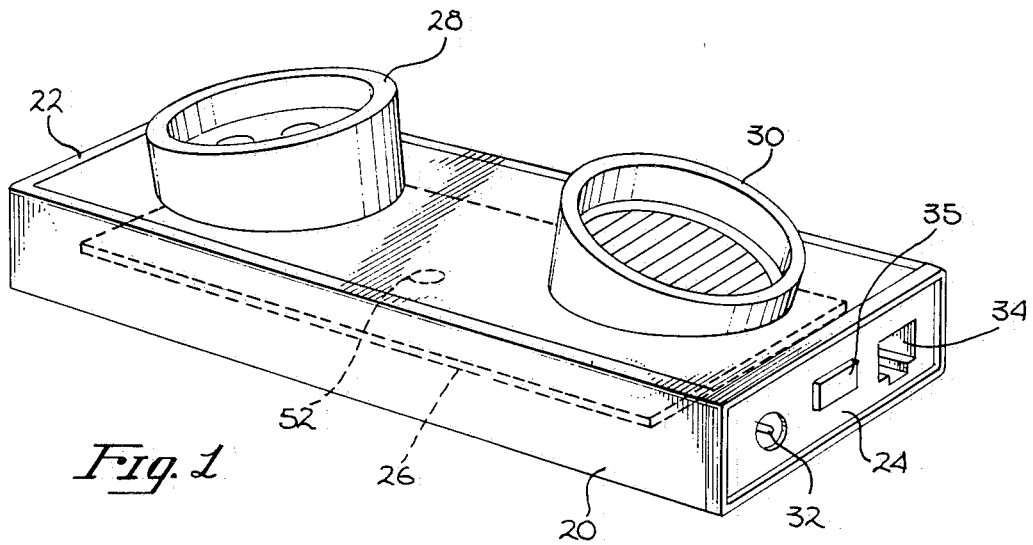
FIG. 1 is a perspective view of one embodiment of the present invention.

First referring to FIG. 1 a perspective view of one embodiment of the present invention may be seen. In this embodiment, an enclosure 20 having end caps 22 and 24 thereon is provided, the enclosure housing a printed circuit board 26 shown in phantom therein and supporting muffs 28 and 30 for receiving conventional telephone handset mouth and earpieces in the same manner as conventional acoustic coupled modems. In that regard, the structure of the enclosure 20, end caps 22 and 24, the support of the printed board 26 and muffs 28 and 30, etc. may be constructed in accordance with U.S. Pat. No. 4,297,530 which patent is also owned by the assignee of the present invention. The device of FIG. 1 is also characterized by a DC power connector 32 mounted to the printed circuit 26 within the enclosure and accessible through an appropriate opening in end cap 24, and may be provided with a battery power supply controlled by on/off-switch 35. Also a female connector 34 for receiving a standard RJ-11 modular connector is provided through the end cap 24 to make electrical connection between such a modular connector and associated connections on printed circuit board 26.

Figure 2:
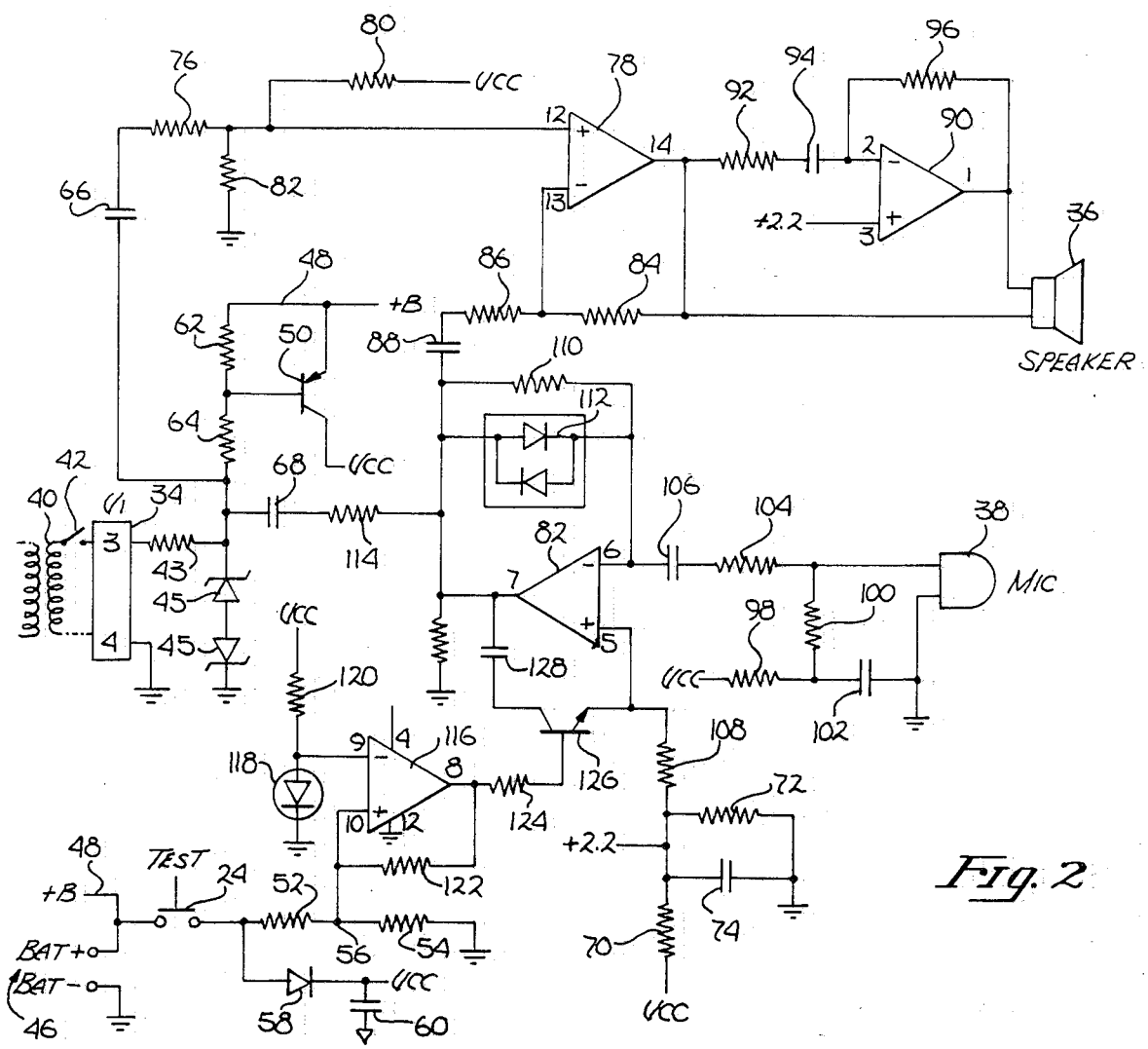
FIG. 2 is a circuit diagram for the circuit of the device shown in FIG. 1.

Now referring to FIG. 2, a circuit diagram for the device of FIG. 1 may seen. The muffs 28 and 30 house a speaker 36 and microphone 38 respectively, which provide the acoustic coupling to and from the telephone handset. The function of the circuit is to couple the speaker 36, microphone 38 and RJ-11 connector 34 in an appropriate manner. Resistor 43 and back-to-back Zener diodes 45 provide circuit protection against line transients, the Zeners normally being inactive. Also shown in phantom is a coupling transformer 40 and switch 42, at least schematically representing the adjacent interface of a typical direct connect modem. In that regard, a typical direct connect modem will provide a relatively high impedance to a phone line as an on-hook signal (switch 42 open) and an approximately 100 ohm load to the phone line when off-hook (switch 42 closed) to provide the off-hook signal to the central office as a result of the loop current through the 100 ohm load. In general, the modem itself will not be dependent upon the loop current and accordingly, the circuit of FIG. 2 need not simulate the normal off-hook line current of a conventional telephone line.

The circuit of FIG. 2 in the preferred embodiment uses a battery source for power, coupled across battery terminals generally indicated by the numeral 46. In the embodiment disclosed an approximately 5 volt battery is used, though typical nine volt transistor batteries or other batteries having an output voltage of at least a few volts are suitable for this purpose. Line 48 is connected directly to the emitter of transistor 50, and is also coupled through a push to test switch 24 to a voltage divider comprised of resistors 52 and 54, coupled in series between the switch 24 and ground to provide, upon depression of the test switch 24, a voltage at the junction 56 between the two resistors which is some predetermined fraction of the battery voltage, regardless of the state of charge of the battery. Also coupled to switch 24 is a diode 58, which upon depression of the push to test switch 24 will charge capacitor 60 to the voltage VCC, the supply voltage for the remainder of the electronic circuit.

The circuit of FIG. 2 includes an automatic on feature through transistor 50. When switch 42 or its equivalent is open (direct connect modem on hook), or disconnected, resistor 62 holds the base of transistor 50 at the battery voltage on line 48, thereby holding the transistor off. In this condition the steady state current through resistor 64 is zero, as capacitors 66 and 68 isolate the adjacent portions of the circuit from the DC voltage, and of course the battery voltage on line 48 is less than the conduction voltage for the back-to-back Zeners 45. When the direct connect modem goes off hook, switch 42 or its equivalent is closed, so that the combination of resistors 43, 64 and 62 act as a voltage divider, pulling the base of transistor 50 sufficiently below the battery voltage on line 48 to turn transistor 50 on. This supplies voltage VCC to the remainder of the circuit, thereby providing power to the operational amplifiers and other points in the circuit identified with the voltage VCC. This in turn provides power to the voltage divider comprised of resistors 70 and 72, thereby providing a reference voltage at the junction therebetween, 2.2 volts in the embodiment illustrated, with capacitor 74 providing a filter for the reference voltage. In the embodiment shown, resistors 62 and 64 are relatively large resistors, so that even though resistor 43 is a relatively low resistance, only a minimal phone line loop current is provided to the direct connect modem. Obviously however, higher loop currents can be simulated, or even a full 20 milliamp loop current may be simulated by appropriate choice of resistor values, though battery life under such conditions may be quite limited, suggesting the use of alternate power sources.

Once the direct connect modem goes off hook and power is automatically supplied to the circuit in response thereto as hereinbefore explained, signals received from the direct connect modem for communication over the phone line are coupled through resistor 43, capacitor 66 and resistor 76 to the positive input of operational amplifier 78, resistors 80 and 82 holding the average or DC level of the positive input of operational amplifier 78 at an intermediate voltage level. Assuming for the moment that the AC output of operational amplifier 82 is substantially zero, operational amplifier 78 will have a gain determined primarily by feedback resistor 84 and resistor 86, capacitor 88 being relatively large, thereby having little effect on the gain of operational amplifier 78. Because of the negative feedback and DC blocking provided by capacitor 88, the DC output of operational amplifier 78 will be equal to the positive input thereto. In that regard, resistor 80 has the same value as resistor 70, and resistor 82 has the same value as resistor 72, so that in the embodiment being described, the DC component of the positive input and thus the DC component of the output of operational amplifier 78 is approximately 2.2 volts. Of course these DC values have on top thereof the AC signal received through connector 34 coupled to the direct connec modem.

The output of operational amplifier 78 is connected directly to one of the inputs to speaker 36. It is also connected through resistor 92 and coupling capacitor 94 to the negative input of operational amplifier 90. This amplifier has a negative feedback resistor 96, and because of its positive input being connected to the 2.2 volt reference, has a quiescent or DC output component of 2.2 volts also, so that the quiescent or DC voltage on speaker 36 is zero. Further, in the preferred embodiment, resistors 92 and 96 are of equal value, so that operational amplifier 90 has a gain of one, or in essence functions as an inverter. Thus, as to AC signals, the AC output of amplifier 78 responsive to the AC signal received from the direct connect modem is applied directly to one lead of speaker 36, and inverted and applied to the other lead of speaker 36, thereby effectively operating the speaker in a push/pull mode to convert the AC signal received from the direct connect modem to a corresponding audio signal of appropriate intensity to couple through speaker 36 to the adjacent microphone in a telephone handset.

AC signals received over the telephone line and converted by the speaker in the telephone handset to a corresponding audio signal are picked up by microphone 38, in the preferred embodiment an Electret microphone. Power is supplied to the microphone through resistors 98 and 100, with capacitor 102 providing noise suppression for this DC power supply. The AC output of the microphone is coupled through resistor 104 and capacitor 106 to the negative input of operational amplifier 82. As shall be subsequently explained, transistor 126 is turned off during normal operation of the circuit, so that the positive input to amplifier 82 is held to the 2.2 volt reference through resistor 108. Amplifier 82 has negative feedback provided by resistor 110 and a pair of diodes 112, the resistor 110 providing a relatively high, low signal gain for the amplifier, with diodes 112 grossly limiting the gain for higher signal amplitudes to prevent oscillation and/or saturation in the system.

The output of operational amplifier 82 is coupled through resistor 114, capacitor 68 and resistor 43 out to the direct connect modem coupled through connector 34. It is, of course, also coupled through capacitor 66 and resistor 76 to operational amplifier 78, and accordingly the AC output signal of microphone 38 will be coupled to the positive input of amplifier 78. The output of amplifier 82 is also coupled through capacitor 88 and resistor 86 to the negative input of operational amplifier 78, the coupling to both the positive input and the negative input of amplifier 78 being of the same polarity, as neither has been inverted by any active devices therebetween. By appropriate selection of the resistor ratios, etc., the coupling to the positive and negative inputs of amplifier 78 of signals originating from microphone 38 may be made equal, so that the output of amplifier 78 is substantially insensitive to such microphone signals. Obviously, in the selection of the various component values to achieve such a result, resistor 84 must also be considered. In essence, assuming first the desired result that the AC output signal of amplifier 82 does not appear on the output of amplifier 78, resistors 86 and 84 will act as a voltage divider in determining the AC input to the inverting or negative input of amplifier 78. Obviously to achieve the desired result, the output of operational amplifier 82 must similarly be divided down by the various resistors in the circuit to provide the same fraction of the output of amplifier 82 on the positive input of amplifier 78 as provided by resistors 86 and 84 to the negative input. Of particular importance are resistors 114 and 43, as these two resistors approximately match the anticipated 600 ohm line impedance representative of the typical phone line and a typical direct connect modem line load. While total elimination of the microphone signal from the output of operational amplifier 78 and thus, from the audio output of speaker 36, is only approximated because of the inability to perfectly balance the circuit, particularly in light of the unknown exact impedance of the direct modem coupled thereto, the coupling of the microphone signal to the speaker output is grossly attenuated so as to have no real affect on the operation of the system.

The battery of the system may be checked by depression of the push to test switch 24, which couples the voltage determined by resistors 52 and 54 to the positive input of operational amplifier 116. Power to the circuit, of course, is supplied through diode 58 during the test. The voltage at point 56 coupled to the positive input of operational amplifier 116 is some predetermined fraction of the battery voltage, and will be higher for a fresh battery than for a week battery. The negative input for operational amplifier 116 is coupled to the junction between light emitting diode 118 and resistor 120, the series combination of the resistor and LED being coupled between VCC and ground. The light emitting diode is used in the circuit not for its light emitting capability (and in fact would emit negligible light because of the relatively high value of resistor 120) but instead, effectively serves as an approximate 1.5 volt Zener diode to clamp the negative input of operational amplifier 116 at approximately 1.5 volts independent of VCC, provided of course VCC exceeds 1.5 volts.

If upon depression of switch 24, the voltage at point 56 exceeds the reference voltage provided by the LED 118, the output of operational amplifier 116 will be positive or high, resistor 122 providing some positive feedback to drive the output substantially to VCC. This positive output is coupled through resistor 124 to turn on transistor 126, coupling the output of operational amplifier 82 through capacitor 128 and transistor 126 to the positive input of the amplifier 82. The capacitive feedback to the noninverting input of amplifier 82 causes the amplifier to oscillate. The oscillation couples to the inputs of amplifier 90, causing an audible test tone through speaker 36 which may be readily detected by the operator prior to the placement of the telephone handset onto the coupler of FIG. 1.

If, on the other hand, the battery is low, the input to the positive or noninverting input of amplifier 116, upon depression of the switch 24, will be lower than the voltage on the inverting input of the amplifier, so that the output of the amplifier will be held low, again the positive feedback through resistor 122 holding the output toward ground. This condition maintains transistor 126 in the off condition, as it is during normal operation of the circuit 32, thereby not generating an audible output in speaker 36. Accordingly, it may be seen that the circuit of FIG. 2 is automatically turned on when the direct connect modem coupled thereto goes off hook, and of course, automatically turned off when the modem goes back on hook, thereby minimizing the power dissipation of the circuit. Further, while provision could readily be made to simulate the full normal phone line loop current of 20 milliamps, not doing so grossly minimizes power dissipation and assures long battery life without requiring the use of alternate power supplies such as, by way of example, separate power supply lines from a computer and/or AC/DC converters. Further, the push to test capability allows a quick and reliable battery test by a user of the device without risk of inadvertent battery discharge through the inadvertent long term operation by leaving an on/off switch on when carried in a brief case, etc.

While a specific physical configuration for the coupler is shown in FIG. 1 as exemplary, other configurations may also be utilized to provide a device of particularly small size and portability. In that regard, one of the advantages of the present invention is its ability to adapt direct connect devices to phone systems not lending themselves to direct connect applications, such as in telephone booths, motels rooms and the like as are likely encountered by traveling businessmen. Accordingly, the present invention allows the use of direct connect devices in a direct connect mode when possible and in an acoustic mode when not.

Obviously while the present invention has been disclosed and described with respect to a preferred embodiment thereof, it will be understood by those skilled in the art that various changes in form and detail may be made therein without departing from the spirit and scope of the invention.

I claim:

1. A coupling unit for acoustic coupling to a telephone line, a direct connect digital device intended to operate by the direct connection thereof to a telephone line, comprising:
   microphone means for receiving acoustic signals from a speaker in a telephone handset;
   speaker means for providing acoustic signals to a microphone in a telephone handset;
   connector means for connecting said coupling unit to the telephone line connection of a direct connect digital device;
   electronic means coupled to said microphone means, said speaker means and said connector means, said electronic means being a means for coupling an electronic signal from said microphone means to said connector means, and coupling an electronic signal from said connector means to said speaker means, said electronic means further including means for eliminating the electronic signal of said microphone means from said speaker means.

2. The coupling unit of claim 1 further comprised of means coupled to said connector means for simulating at least a minimum telephone line loop current.

3. The coupling unit of claim 2 further comprised of detection means for detecting when a direct connect digital device connected to said coupling unit goes off-hook.

4. The coupling unit of claim 3 wherein said detection means is a means for providing power to said electronic means upon the direct connect digital device going off-hook.

5. A coupling unit for acoustic coupling to a telephone line, a direct connect digital device intended to operate by the direct connection thereof to a telephone line, comprising:
   microphone means for receiving acoustic signals from a speaker in a telephone handset and providing a microphone signal in response thereto;
   speaker means for providing acoustic signals to a microphone in a telephone handset in response to a speaker signal provided thereto;
   connector means for connecting said coupling unit to the telephone line connection of a direct connect digital device;
   means coupled to said connector means for simulating at least a minimum telephone line loop current;
   first electronic means for coupling said microphone means to said connector means to couple said microphone signal to said connector means;
   second electronic means for coupling a line signal received by said connector means to said speaker means, whereby said first and second electronic means are both coupled to said connector means;
   said first and second electronic means further including means for combining said line signal and said microphone signal to substantially eliminate a line signal originating in said microphone means from said speaker means.

6. The coupling unit of claim 5 further comprised of detection means for detecting when a direct connect digital device connected to said coupling unit goes off-hook.

7. The coupling unit of claim 6 wherein said detection means is a means for providing power to said electronic means upon the direct connect digital device going off-hook.

* * * * *